United States Patent [19]

Cusick et al.

[11] Patent Number: 4,783,093
[45] Date of Patent: Nov. 8, 1988

[54] TRAILER BED LIFT

[75] Inventors: Kent Cusick, Richwood; Kevin Criswell, Marion, both of Ohio

[73] Assignee: K. C. Mfg., Inc., Marion, Ohio

[21] Appl. No.: 909,623

[22] Filed: Sep. 19, 1986

[51] Int. Cl.⁴ .............................................. B62D 53/06
[52] U.S. Cl. .................... 280/405 A; 248/184;
280/43.2; 280/43.22; 280/43.23; 280/80 B; 280/656
[58] Field of Search .............. 280/405 A, 405 R, 656, 280/80 B, 80 R, 81 R, 83, 43.22, 43.23, 43.17, 43.1, 43.2; 248/184

[56] References Cited

U.S. PATENT DOCUMENTS

| | | | |
|---|---|---|---|
| 2,715,029 | 8/1955 | Compton | 280/43.23 X |
| 2,941,818 | 6/1960 | Hubbard | 280/405 A |
| 3,085,816 | 4/1963 | Tantlinger et al. | 280/80 B |
| 3,425,710 | 2/1969 | Hulverson | 280/81 R |
| 3,847,405 | 11/1974 | Pearce | 280/656 |

FOREIGN PATENT DOCUMENTS

| | | |
|---|---|---|
| 1530800 | 7/1969 | Fed. Rep. of Germany. |
| 673521 | 7/1979 | U.S.S.R. ................. 280/43.23 |

OTHER PUBLICATIONS

Machine Design, (Penton Publication), Sep. 9, 1971, pp. 73 and 74.

Primary Examiner—John J. Love
Assistant Examiner—Mitchell J. Hill
Attorney, Agent, or Firm—Woodcock Washburn Kurtz Mackiewicz & Norris

[57] ABSTRACT

Method and apparatus for relieving friction during adjustment of a sliding tandem trailer's rear wheel assembly with respect to the trailer bed includes a plurality of bed lift devices mounted in the vicinity of the rear wheel assembly. Each of the devices are pivotally mounted to a sliding frame member of the rear wheel assembly for engagement with a respective fixed frame member of the trailer bed. By moving a roller, supported upon a pin which is rotatably mounted to a hydraulically-actuated piston contained within the device, into and out of engagement with the fixed frame member, the relative position of the rear wheel assembly may be suitably adjusted with a minimum of friction to a desired position which properly distributes, relative to the axles of the rear wheel assembly and the axles of the cab, the load upon the trailer bed.

15 Claims, 3 Drawing Sheets

TRAILER BED LIFT

BACKGROUND OF THE INVENTION

This invention relates generally to tractor-pulled trailers, and more particularly to a friction relieving device for sliding tandem trailers.

In all states of the United States, there are various weight limits for trucks. Weight limits are defined on a per axle basis. With certain trailers, such as but not limited to flat bed trailers, the position of the load on the trailer may be too far forward of the rear wheels and thus too close to the wheels of the truck cab. In such a circumstance, the per axle load limit may be exceeded by the wheels of the cab. Alternatively, the load may be too far rearward on the trailer thus imposing an undue load on the trailer wheels as opposed to the wheels of the cab. With a sliding tandem trailer, the rear wheel assembly of the trailer may be moved forward or aft with respect to the bed of the trailer as needed so as to adjust the load distribution and insure that the load limits are not exceeded.

With prior art sliding tandem trailers, the movement of the tandem wheel assembly forward or aft with respect to the trailer was difficult, particularly when the truck was loaded. Thus, for example, a given truck may be fully loaded as it leaves its depot. If the loaded truck proceeds to a first weighing station where, for the first time, it is determined that the per axle weight limitation has been exceeded, it is necessary to adjust the load distribution of the loaded truck. It is not feasible, at that point, to unload the truck such that the load distribution may be adjusted in a normal fashion. Accordingly, the load must adjusted in place. To accomplish this technique, with various prior art approaches, the brakes of the trailer are set and the cab is put into a reverse gear. As the rear wheel assembly slides along the bed of the trailer, the cab-trailer wheelbase is shortened. Alternatively, the cab may be placed in a forward gear thus elongating the cab-trailer wheelbase if necessary. Because of the extraordinary friction involved in moving the tandem wheel assembly with respect to the fully loaded trailer, severe loads may be placed upon the cab drive train.

To alleviate this problem, various prior art solutions have been proposed. With one such solution, polyurethane pads have been provided which are situated between the tandem wheel assembly and main frame of the trailer bed. However, these pads have not adequately reduced friction.

In another approach, a retrofit arrangement including rollers situated between the tandem wheel assembly and the main frame of the trailer bed have been provided. One such arrangement is disclosed in U.S. Pat. No. 3,085,816 issued to Tantlinger. The Tantlinger patent is directed to an adjustable suspension system comprising a lift mechanism mounted on the tandem wheel assembly and operable to concurrently disengage a locking means between the tandem wheel assembly and trailer body and to engage a plurality of anti-friction rollers with a complementary track on the trailer body to facilitate relative movement therebetween. When the rollers are disengaged from the track by means of hydraulic pressure, the lock is automatically engaged to preclude relative longitudinal movement between the tandem wheel assembly and trailer body. Similar approaches are disclosed in German Patent No. 1,530,800, in which the moving of a roller from a recessed position to an upper position is used to space a bed from a tandem wheel assembly, and U.S. Pat. No. 3,847,405 issued to Pearce, in which rollers, mounted within housings on two transverse channels, provide a means whereby a slidable frame member may be easily rolled into and out of a main frame member thus telescoping a dump trailer.

One characteristic problem of the above described friction relieving devices, however, is that their performance may often be unsatisfactory in that rust, ice, dirt and the like tend to impede adjustment of the tandem wheel assembly with respect to the trailer body. Because of their open nature, such devices are typically exposed to road hazards which may become lodged in areas of translation thereby increasing the friction involved in moving the tandem wheel assembly with respect to the fully loaded trailer. It is desirable, therefore, to provide a friction relieving device for sliding tandem trailers which is self-contained and which minimizes the exposure of its moving elements to hazards such as rust, ice, and dirt.

Another major problem with prior art devices utilizing rollers as friction relieving devices is that the rollers often develop flat spots caused by the pressure of the loaded trailer bed upon the rollers. Not only must the rollers be capable of moving into and out of engagement with the trailer bed in order to adjust the cab-trailer wheelbase, but also they must be capable of maintaining a substantially cylindrical shape in order to minimize the friction caused by the weight of the fully loaded trailer upon the rollers during adjustment. Typical rollers used in prior art approaches develop flat spots, either across the entire face of a roller as caused by leaving the roller in its engaged position while supporting the weight of the fully loaded trailer, or localized flat spots caused by unequal pressure from the fully loaded trailer due to distorted frame members upon which the rollers translate. That is, the unequal pressures caused by distorted frame members force the bearing surfaces used in such devices to deteriorate, thereby causing the rollers to seize up and subsequently develop flat spots.

Every beam must deflect under the load which is applied to it and it will therefore be distorted into a curved or bent shape. Material on the concave or compression face of a bent beam will be shortened or strained in compression, while material on the convex or tension face will be lengthened or strained in tension. It has been found advantageous in the past to design beams for use as fixed frame members with highly asymmetrical cross-sections. That is, in order to provide a fixed frame member which is capable of withstanding repeated distortions due to load distribution and over-the-road hazards such as bumps and potholes, the beams used as fixed frame members often have an interconnecting web that is offset, or away from the centerline, relative to its upper and lower flanges. Such offset webs, however, also cause distortions in the lower flanges when under load.

The present invention is directed to a means for reducing the friction in such sliding tandem trailers which does not suffer from the above described defects. Accordingly, it is a general object of the present invention to provide a device for sliding tandem trailers which minimizes the friction between the trailer bed and its tandem wheel assembly during adjustment. More specifically, it is an object of this invention to provide a friction relieving device that is especially suitable for adjusting the cab-trailer wheelbase of a fully loaded trailer.

Another object of the invention is to provide an enclosed truck bed lift assembly for adjusting the cab-trailer wheelbase of a sliding tandem trailer, in which the moving parts of the assembly are not exposed to the degrading effects of rust, ice, and dirt.

Yet another object of the invention is to provide a bed lift device which is lightweight, easy to manufacture and install, and which provides both rolling and pivoting action to overcome problems of lower flange distortions caused by offset webs under load.

SUMMARY OF THE INVENTION

Briefly, these and other objects of the present invention are accomplished by apparatus including four hydraulic cylinders which are provided in the vicinity of the tandem wheel assembly. Rollers, rotatably mounted upon pistons encased within respective barrels mounted to the underside of the trailer, are coupled to each of the hydraulic cylinders. When the rollers are in their downward or disengaged position, the tandem wheel assembly is immovable with respect to the trailer bed. However, when the rollers are in their upward or engaged position, the tandem wheel assembly slides freely with respect to the trailer bed. Such movement of the rollers up and down or into and out of engagement with the trailer bed is provided by hydraulic pressure against the piston faces, while freedom of movement of the rollers is insured by pivoting the barrel assembly containing the piston-mounted rollers about an axis which is perpendicular to the axis of rotation of the rollers, thereby preventing flat spots upon the rollers caused by unequal pressure from the fully loaded trailer.

Other objects, advantages and novel features of the invention will become apparent from the following detailed description of the invention when considered in conjunction with the accompanying drawings wherein:

DETAILED DESCRIPTION OF THE INVENTION

Figure 1:
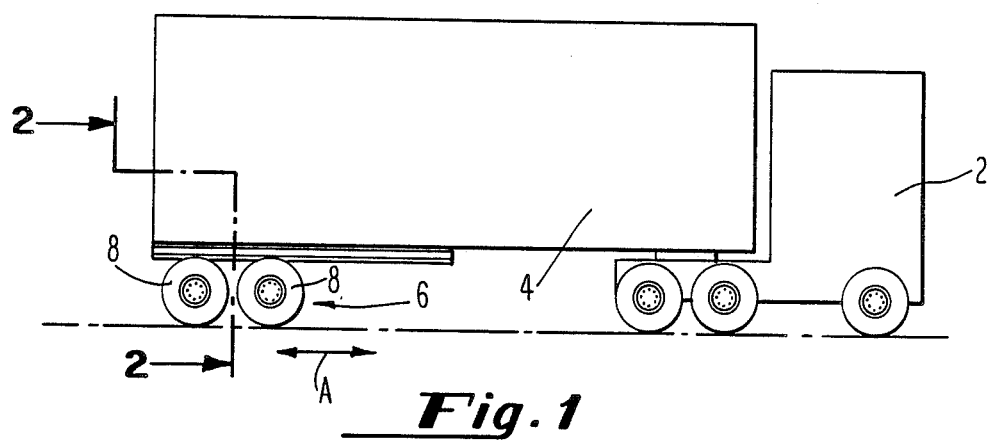
FIG. 1 is a side elevation of a tractor and an associated trailer body having a rear wheel assembly in operative association therewith.
Figure 2:
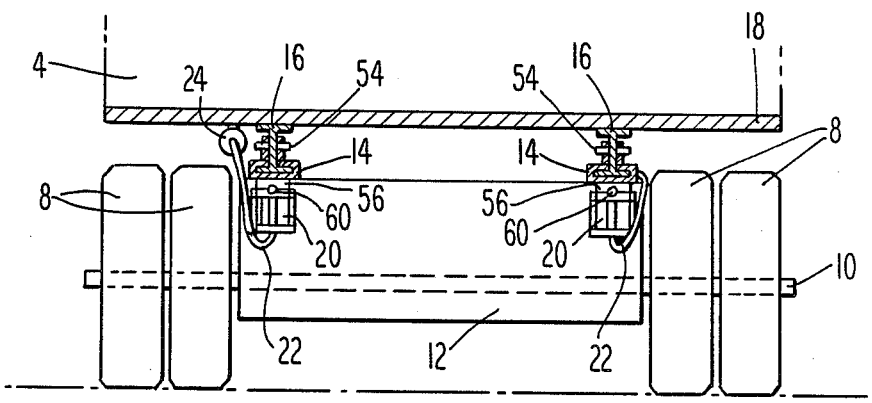
FIG. 2 is a rear elevational view, partly broken away and partly in section along lines 2—2 of the trailer shown in FIG. 1, showing in detail the interrelation between the sliding and fixed frame members for the rear wheel assembly and the bed lift device of the present invention.

Referring now to the drawings, wherein like characters designate like or corresponding parts throughout the several views, there is shown in FIG. 1 a side elevation of a tractor 2 operatively coupled to a trailer body 4 having an associated and adjustable rear wheel assembly shown generally at 6. As shown in conjunction with FIG. 2, the rear wheel assembly 6, sometimes referred to as a "bogie", includes a plurality of wheels 8, typically eight in number, mounted upon axles 10, as well as a center section 12 with a pair of parallel sliding frame members 14 attached thereto. Each of the sliding frame members 14 are slidingly coupled to a respective one of a pair of fixed frame members 16 supporting the bed 18 of the trailer body 4. The fixed frame members 16 typically comprise a pair of I-beams running parallel to each other along the bottom of the trailer bed.

In order to move the rear wheel assembly 6 back and forth in the direction indicated by the arrow A shown in FIG. 1, and thereby to adjust the load distribution of the trailer body 4 as required, a bed lift device 20 is mounted on the underside of each of the sliding frame members 14 which, in turn, are mounted upon the rear wheel assembly 6. One such bed lift device 20 is provided in the vicinity of each pair of wheels 8 on either side of the center section 12. Thus, although only two such bed lift devices 20 may be seen in the embodiment shown in FIG. 2, four bed lift devices 20 are preferably provided, with each of the bed lift devices 20 being further coupled by a hose 22 to a hydraulic pump 24 capable of producing pressures of, for example, 1000 pounds.

Figure 3C:
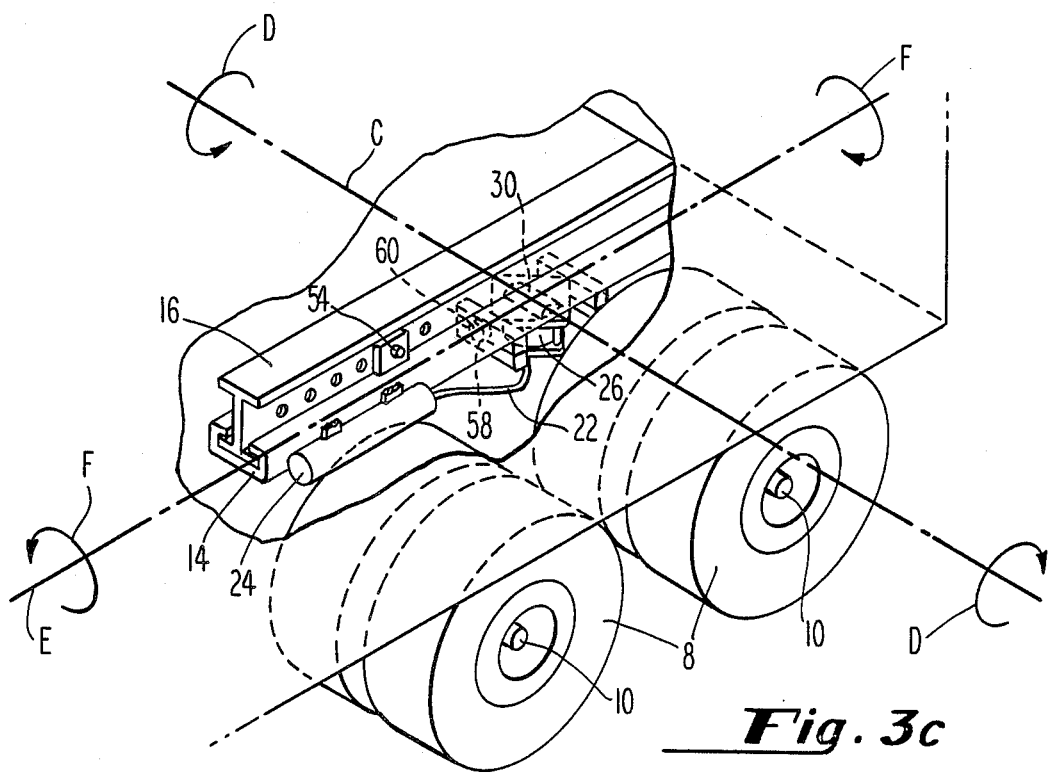
FIG. 3c is an isometric view of the bed lift device shown in FIG. 2.
Figure 3A:
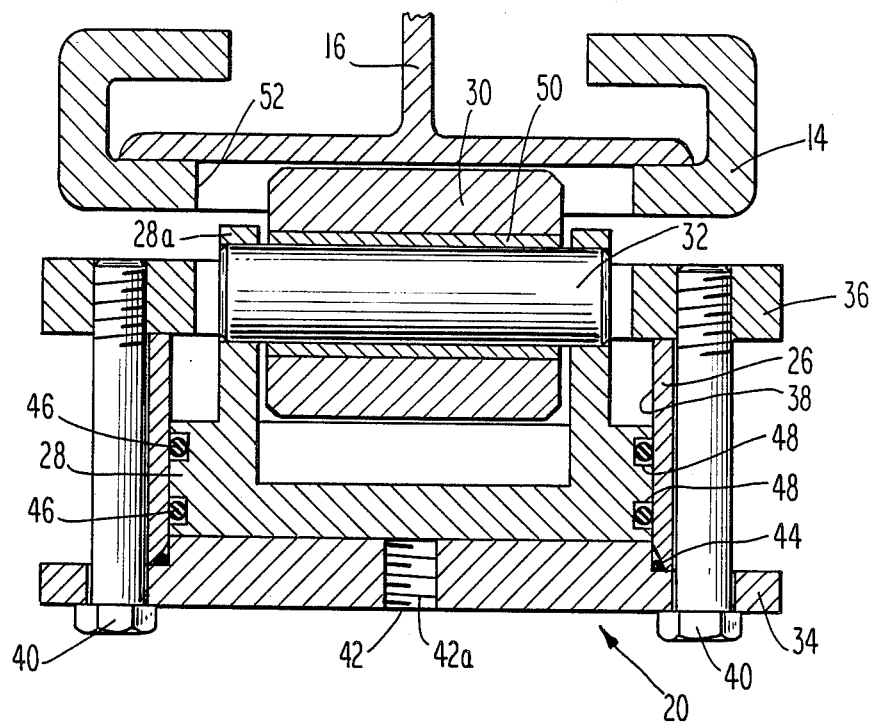
FIG. 3a is a sectional view of the bed lift device shown in FIG. 2, shown in its disengaged position.
Figure 3B:
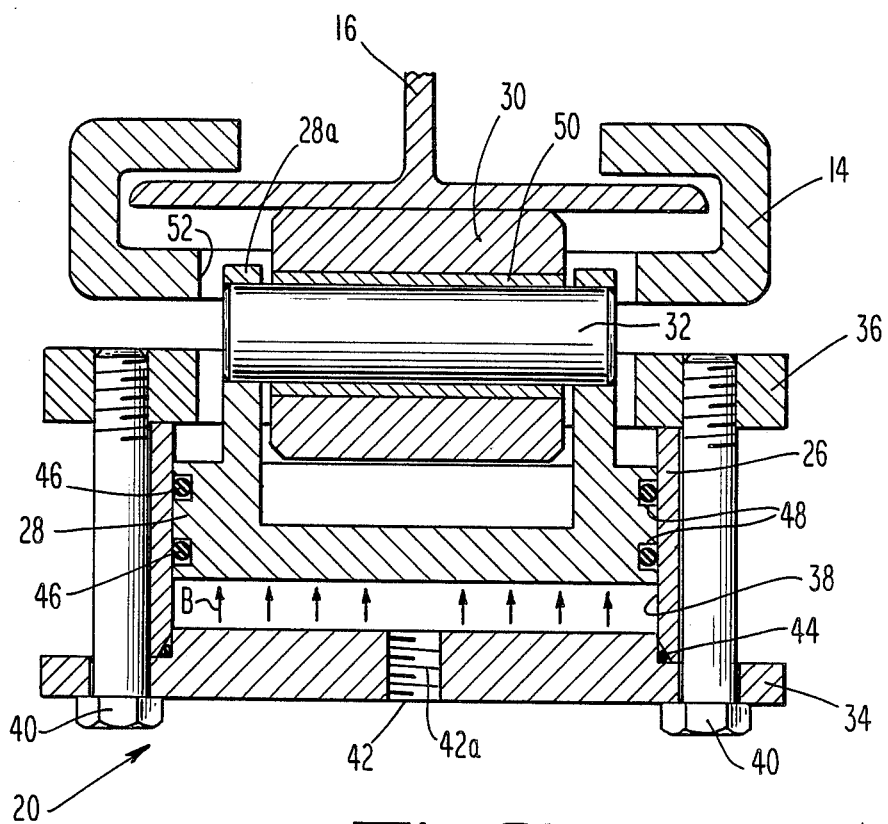
FIG. 3b is a sectional view of the bed lift device shown in FIG. 2, shown in its engaged position.

Referring now to FIGS. 3a, 3b, 3c and 4 the operation of each of the bed lift devices 20 in accordance with the present invention will be shown. It will be noted at this juncture that the bed lift devices 20 described herein are especially suitable for installation upon trailers having fixed frame members 16 with webs offset from the centerline as shown in FIGS. 3a and 3b. Each bed lift device 20 is comprised generally of a cylindrical barrel 26 containing a piston 28 in its interior portion. The piston 28 supports a roller 30 rotatably mounted upon a pin 32 coupled to a clevis portion 28a of the piston 28. The barrel 26 is suitably attached between a base plate 34 and a pivot top 36, thereby forming a cylinder housing 38 within which the piston 28 may be moved. Any suitable means of attaching the base plate 34 to the pivot top 36, such as the bolts 40 shown in FIG. 3a, may be used. The cylinder housing 38 is fixed with respect to the sliding frame member 14 by any suitable means.

In order to move the rollers 30 into an engaged position as shown in FIG. 3b, the base plate 34 has formed therein a hole 42 with threaded portions 42a for the acceptance of a standard fitting such as a ¼ inch national pipe thread (NPT) fitting attached to the end of the hydraulic hose 22. For optimization of the compression provided by the hydraulic cylinder 24, an O-ring 44 is provided between a shoulder portion 34a of the base plate 34 and the barrel 26, while a pair of O-rings 46 are installed in a pair of spaced, annular channels 48 formed about the periphery of the piston 28. A sleeve bearing 50 is also suitably provided about the pin 32 in order to facilitate rotation of the roller 30 during its operation.

Referring now to FIG. 3b, it can be seen that an upward hydraulic pressure (as indicated by the arrows B) caused by the hydraulic pump 24 is formed within the cylinder housing 38 thus pushing the piston 28 and attached roller 30, through an access hole 52 formed in the sliding frame member 14, up and into engagement with the fixed frame member 16 of the trailer body 4. As previously indicated in conjunction with the discussion of FIGS. 1 and 2, the brakes of the rear wheel assembly 6 may then be set and the tractor 2 engaged to move the trailer body 4 upon the sliding frame members 14 forward or backward as required to appropriately distribute the weight of the fully loaded trailer 4. When the rear wheel assembly 6 has been suitably adjusted, the hydraulic cylinders 24 are deactuated, and the hydraulic pressure bled from the cylinder housings 38 allowing the pistons 28 and associated rollers 30 to move down and out of engagement with the fixed frame members 16. The fixed frame members 16 thus rest upon the sliding frame members 14 causing the rear wheel assembly 6 to be immovable with respect to the trailer body 4. Any conventional locking means, such as the pins 54 (FIGS. 2 and 3a) may be used to prevent any subsequent movement of the sliding frame members 14 relative to the fixed frame members 16.

Figure 4:
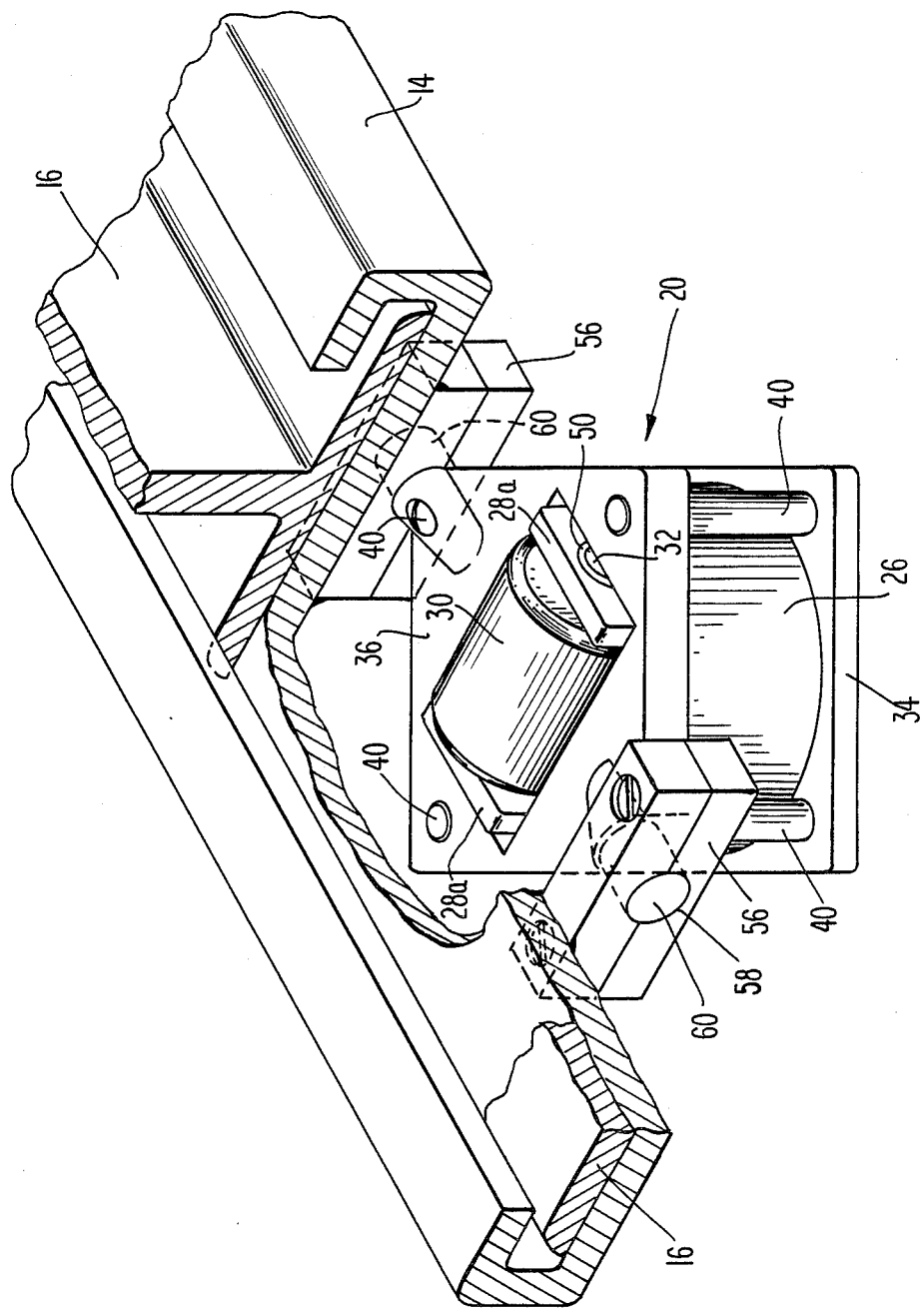
FIG. 4 is a detailed view of the bed lift device shown in FIG. 3c.

In accordance with another important aspect of the invention, and referring now to FIGS. 3c and 4, the bed lift devices 20 are pivotally mounted to the sliding frame members 14 by a pair of mounting brackets 56. Each of the mounting brackets 56 have formed therein a hole 58 for supporting a cylindrical pin portion 60 of the pivot top 36. Thus, while the roller 30 of the bed lift device 20 is in its engaged position against the fixed frame member 16, it is not only capable of rotation about a transverse axis C in a direction as shown by the arrow D in FIG. 3c, but also is capable of pivoting about an axis of engagement or longitudinal axis E in a direction as shown by the arrow F in FIG. 3c. In such a manner, unequal pressures due to distortions in the fixed frame member 16 such as those designed with offset webs will not bind the bed lift device 20, and will thus alleviate problems of flat spots caused in prior art rollers when their bearings were deteriorated by such unequal pressures. The pin portions 60, accordingly, permit rotation of the transverse axis C about the longitudinal axis E.

Some of the many advantages of the invention should now be readily apparent. For example, a novel bed lift device has been provided which is capable of relieving the friction caused between the bed of a fully loaded trailer and its rear wheel assembly during adjustment to distribute the load as required by law. In operation, the brakes of the rear wheel assembly are first set, hydraulic cylinders are then actuated thus providing hydraulic pressure to each of the bed lift devices and causing their associated pistons with rollers mounted thereon to drive up and into engagement with fixed frame members of the trailer body. The loaded trailer is then pulled by its tractor causing the fixed frame members to roll upon the now stationary rear wheel assembly. Once the appropriate adjustment has been made, the hydraulic cylinders are deactuated, causing the pistons and rollers to move down and out of engagement with the fixed frame members, whereupon any conventional locking means may be utilized to lock the rear wheel assembly in place relative to the fixed frame members. The bed lift assembly not only provides a self contained apparatus which minimizes friction and maximizes protection of its moving elements from hazards such as rust, ice, and dirt, but also provides the means for pivoting the roller through the pin portion of the pivot top as coupled to the mounting brackets on the underside of the sliding frame members, thus providing an improved bed lift assembly which is not subject to flat spots and bearing deterioration caused by unequal pressure from a distorted fixed frame member.

Many modifications and variations of the present invention are possible in light of the above teachings. It is therefore to be understood that within the scope of the appended claims, the invention may be practiced otherwise than as specifically described.

What is claimed is:

1. An improved trailer bed lift for a tractor-pulled trailer of the type having a bed for carrying a load, a first frame means for supporting the bed, and a rear wheel assembly supporting the load upon the bed, said rear wheel assembly including second frame means slidingly coupled to the first frame means for adjustably distributing the weight of the load upon the bed by selectively moving the first frame means relative to the second frame means along a longitudinal axis of the bed, wherein the trailer bed lift comprises:
   roller means, attached to the second frame means, for reducing friction caused by slidable engagement of the first frame means with respect to the second frame means, said roller means being rotatable about at least one transverse axis thereby permitting adjustment of the position of the rear wheel assembly relative to the bed along the longitudinal axis; and
   means, coupled to said roller means, for pivoting said roller means about an axis of engagement substantially parallel to the longitudinal axis.

2. An improved trailer bed lift according to claim 1, wherein said first frame means includes a pair of rails longitudinally affixed to the underside of the bed; and wherein said second frame means includes a pair of channels containing said rails and wherein said roller means comprises:
   at least one cylinder attached to each of said channels;
   a piston associated with each such cylinder, each such piston being operable from a first, disengaged position within said cylinder to a second, engaged position; and
   a roller wheel associated with each such piston.

3. An improved trailer bed lift according to claim 2, wherein said pivoting means comprises:
   mounting means attached to each of said channels;
   a pin attached to each such mounting means, each such pin being oriented paralled to said longitudinal axis, said cylinder being rotatably mounted to each such pin.

4. A sliding tandem trailer comprising:
   a bed for carrying a load, said bed including first frame means for bearing the weight of said load;
   a rear wheel assembly supporting said bed for transporting said bed with a tractor, said rear wheel assembly including second frame means slidingly coupled to said first frame means for adjustably distributing the weight of said load; and
   means for adjusting the position of said rear wheel assembly relative to said bed along its longitudinal axis, said adjusting means including:
   roller means for slidably engaging said first frame means to said second frame means along an axis of engagement substantially parallel to the longitudinal axis of said bed; and
   means coupled to said roller means for pivoting said roller means about said axis of engagement.

5. A trailer according to claim 4, wherein said first frame means comprises a pair of longitudinally extending rails affixed to the underside of said bed.

6. A trailer according to claim 5, wherein said rails comprise I-beams having an offset web.

7. A trailer according to claim 6, wherein said second frame means comprises a pair of seating ways for containing said rails.

8. A trailer according to claim 7, further comprising locking means for securing the relative position of said rails within said ways.

9. A trailer according to claim 7, wherein said adjusting means further comprises:
- a plurality of cylinders, each of said cylinders including a pivotably mounted top plate attached to said ways at access ports formed therein;
- a piston adapted to be actuated from a first, disengaged position to a second, engaged position; and
- a pin rotatably supporting said roller means; and
- hydraulic means operatively coupled to said cylinders for moving said piston between said first and second positions, thereby engaging and disengaging said roller means with said rails.

10. A trailer according to claim 9 having at least one cylinder coupled to each of said ways in the vicinity of each of the axles of said rear wheel assembly.

11. An improved trailer bed lift of the type employing a hydraulic actuator to adjust load distribution of a trailer bed, comprising:
- cylinder means, coupled to said hydraulic actuator, for containing a hydraulic pressure during the operation of said hydraulic actuator;
- piston means within said cylinder means movable by said hydraulic pressure;
- roller means, coupled to said piston means and operable from a first, disengaged position to a second, engaged position by said hydraulic pressure, said roller means supporting the trailer bed in said second, engaged position for translation of a tandem wheel assembly along an axis of engagement beneath the trailer bed between selected load-distributing position, said axis of engagement being substantially parallel to a longitudinal axis of the trailer bed; and
- pivot means, coupled to said roller means, for pivoting said roller means about said axis of engagement perpendicular to an axis of rotation for said roller means.

12. An improved trailer bed lift according to claim 11, wherein said cylinder means comprises:
- a pair of mounting brackets attached to the trailer bed, each of said mounting brackets having a hole therein;
- a top plate pivotably mounted between said mounting brackets;
- a base plate; and
- a barrel portion attached between said base plate and said top plate.

13. An improved trailer bed lift according to claim 11, wherein said roller means comprises:
- a piston having a clevis portion formed at one end thereof;
- a clevis pin rotatably mounted within the clevis portion of said piston;
- a sleeve bearing coupled about said clevis pin between the clevis portion of said piston; and
- a roller mounted about said sleeve bearing.

14. An improved trailer bed lift according to claim 11, wherein said piston further comprises:
- a pair of annular channels formed in a spaced relationship about the periphery of said piston; and
- a pair of O-rings coupled within said channels to provide a seal between said piston and said barrel.

15. An improved trailer bed lift according to claim 12, wherein said top plate further comprises a pair of pins mounted within said holes formed in said mounting brackets to pivot said roller means about said axis of engagement.

* * * * *